(12) United States Patent
Shindgikar et al.

(10) Patent No.: US 9,303,474 B2
(45) Date of Patent: Apr. 5, 2016

(54) COMPOSITION FOR BOREHOLE TREATMENT

(75) Inventors: Nikhil Shindgikar, Paris (FR); Jesse Lee, Paris (FR)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 1136 days.

(21) Appl. No.: 13/120,254

(22) PCT Filed: Aug. 13, 2009

(86) PCT No.: PCT/EP2009/005898
§ 371 (c)(1),
(2), (4) Date: Aug. 12, 2011

(87) PCT Pub. No.: WO2010/034379
PCT Pub. Date: Apr. 1, 2010

(65) Prior Publication Data
US 2011/0297375 A1 Dec. 8, 2011

(30) Foreign Application Priority Data

Sep. 26, 2008 (EP) ..................... 08165206

(51) Int. Cl.
| | | |
|---|---|---|
| *C09K 8/42* | (2006.01) | |
| *C09K 8/60* | (2006.01) | |
| *E21B 21/00* | (2006.01) | |
| *C04B 20/10* | (2006.01) | |
| *C09K 8/487* | (2006.01) | |
| *C09K 8/575* | (2006.01) | |
| *E21B 33/138* | (2006.01) | |
| *E21B 43/02* | (2006.01) | |

(52) U.S. Cl.
CPC ........... *E21B 21/003* (2013.01); *C04B 20/1033* (2013.01); *C04B 20/1037* (2013.01); *C09K 8/487* (2013.01); *C09K 8/5751* (2013.01); *E21B 33/138* (2013.01)

(58) Field of Classification Search
None
See application file for complete search history.

(56) References Cited

U.S. PATENT DOCUMENTS

| | | | |
|---|---|---|---|
| 3,954,629 A | | 5/1976 | Scheffel et al. |
| 4,767,549 A | * | 8/1988 | McEwen et al. ............. 507/131 |
| 5,143,961 A | | 9/1992 | Scholl et al. |
| 5,222,558 A | * | 6/1993 | Montgomery et al. ....... 166/278 |
| 5,501,274 A | | 3/1996 | Nguyen et al. |
| 5,582,249 A | * | 12/1996 | Caveny et al. ................ 166/276 |
| 6,870,006 B2 | | 3/2005 | Cavalli et al. |
| 7,284,611 B2 | | 10/2007 | Reddy et al. |

(Continued)

FOREIGN PATENT DOCUMENTS

| | | |
|---|---|---|
| WO | 2007/041782 | 4/2007 |
| WO | 2008/008625 | 1/2008 |

OTHER PUBLICATIONS

International search report for the equivalent PCT patent application No. PCT/EP2009/005898 issued on Oct. 20, 2009.
Materials Science and Engineering: vol. 476, Issues 1-2, Mar. 15, 2008, pp. 29-33; "Urea route to coat inorganic nanowires, carbon fibers and nanotubes by boron nitride". A. Gomathia, M. Ramya Harikaa and C.N.R. Rao.

(Continued)

*Primary Examiner* — John J Figueroa

(57) ABSTRACT

A composition, for use in treating oil wells, comprises fibers, hot melt adhesives and particulate solids. This composition has a wide range of applications including preventing or lessening lost circulation, wellbore strengthening or consolidation, controlling fluid loss, producing a "stress cage" effect, gravel packing, acting as an aid to cementing, and for proppant backflow control.

12 Claims, 2 Drawing Sheets

(56) References Cited

U.S. PATENT DOCUMENTS

| | | | |
|---|---|---|---|
| 7,754,659 B2 * | 7/2010 | Rediger et al. | 507/269 |
| 8,061,424 B2 * | 11/2011 | Willberg et al. | 166/280.2 |
| 2003/0011235 A1 | 1/2003 | Mills | |
| 2008/0011477 A1 * | 1/2008 | Rediger et al. | 166/280.2 |
| 2010/0263870 A1 * | 10/2010 | Willberg et al. | 166/305.1 |

OTHER PUBLICATIONS

S. Michielsen, J. Appl. Polym. Sci. 73: 129-136 (1999).

M.S. Aston, et al., "A New Treatment for Wellbore Strengthening in Shale," SPE Annual Technical Conference and Exhibition held in Anaheim, California, USA, Nov. 11-14, 2007.

\* cited by examiner

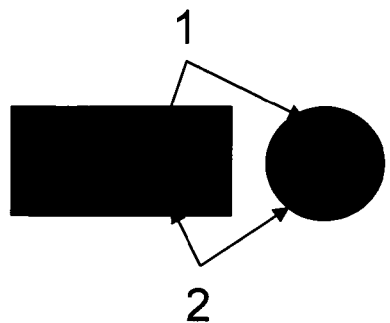
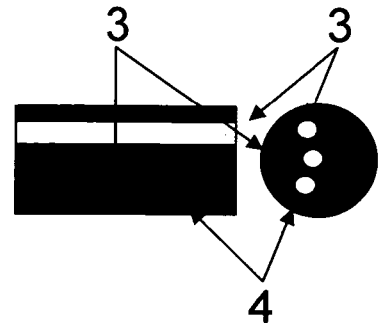
Figure 1A  Figure 1B
Figure 2
Figure 3
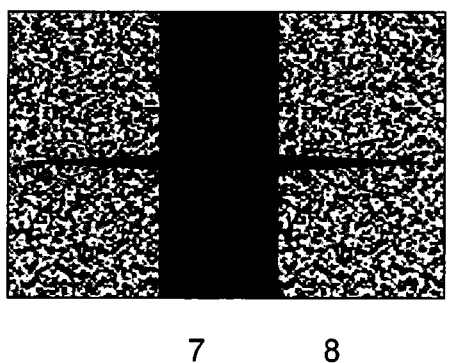
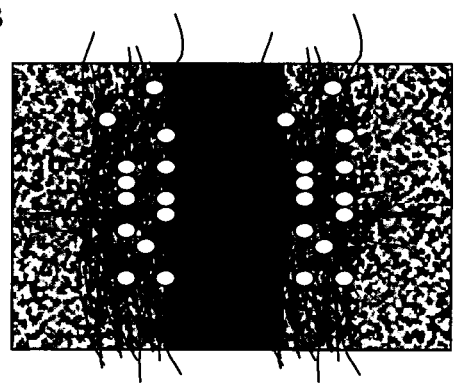
Figure 4  Figure 5

COMPOSITION FOR BOREHOLE TREATMENT

BACKGROUND OF THE INVENTION

The statements in this section merely provide background information related to the present disclosure and may not constitute prior art.

This invention relates to a composition for treating a borehole such as an oil or gas well, comprising fibres and hot melt adhesives. Such compositions find uses in control of borehole instability and lost circulation problems.

In the oilfield industry, various products and techniques have been used in the past to reduce lost circulation and wellbore consolidation issues, which occur in many parts of the world and cause undesirable losses of time and money. Known methods of curing lost circulation are the use of loss circulation materials (LCMs) in drilling fluid and/or in cement or polymer systems, and the use of single-type or mixed fibres. However, the success rate and efficiency are often not satisfactory.

The present invention involves the use of hot melt adhesives. Hot melt adhesives are not widely used in the oilfield industry. The invention is based on the recognition that the ability of hot melt adhesives to dissolve completely or partially depending on adhesive formulation and temperature range makes them suitable for oilfield applications.

Hot melt adhesives are solvent-free adhesives which are solid up to a certain temperature, after which they become (semi-) liquids, and on cooling again become solid. The melting or phase transition temperature depends on the polymer amount and/or composition of other additives present in the adhesive formulation. The temperature range typically varies from 60° C. to 250° C. depending on thermal properties, i.e. glass transition temperature of polymers and/or blends, of copolymers and additives used as coatings or for grafting purpose. Hot melt adhesives can commonly be derived from ethylene-vinyl acetate (EVA) copolymers, styrene-isoprene-styrene (SIS) copolymers, styrene-butadiene-styrene (SBS) copolymers, ethylene ethyl acrylate copolymers (EEA), and polyurethane reactive (PUR) generally with a polymer content ranging from 5% to 80%, and can have controllable water solubility. Examples of such adhesives can be found in U.S. Pat. No. 5,143,961 or U.S. Pat. No. 6,870,006. The "ring-and-ball" i.e. softening temperature of the hot melt adhesives typically ranges from 60° C. to 80° C.

U.S. Pat. No. 3,954,629 discloses the use of polyethylene, ethylene-vinyl acetate copolymer as a plugging agent in treating high-temperature, permeable oil-bearing formations.

DISCLOSURE OF INVENTION

A first aspect of the invention relates to a composition for treating a formation surrounding a borehole, comprising a well treatment fluid including fibres suitable for treating a region of the borehole, at least one hot melt adhesive component, and at least one solid particulate component; wherein the fibres are arranged to accumulate in the region of the borehole, and the hot melt adhesive is arranged to soften and cause the fibres to adhere to each other when the temperature in the region of the borehole is raised above the transition temperature of the adhesive component such that the solid particulate component can accumulate in the fibres.

Particles of the hot melt adhesive component can be grafted onto at least some of the fibres and/or at least some of the fibres can be coated with the hot melt adhesive component.

The fibres preferably have diameters ranging from 10 microns to 500 microns, and lengths ranging from 5 mm to 15 mm.

The fibres are typically present in an amount of 0.5 lb/bbl (1.4 g/L) to 8 lb/bbl (23 g/L), preferably from 0.5 lb/bbl (1.4 g/L) to 6.5 lb/bbl (18.5 g/L), more preferably from 2 lb/bbl (5.7 g/L) to 6.5 lb/bbl (18.5 g/L) and even more preferably from 2 lb/bbl (5.7 g/L) to 5 lb/bbl (14.3 g/L).

The hot melt adhesive component preferably comprises polyamides, acrylic based systems, ethylene vinyl acetate, polyurethanes, and can be present in an amount of 0.1% wt to 10% wt.

Particulate solid lost circulation materials, such as sized calcium carbonate, polypropylene particles, nut plugs, natural or synthetic rubbers can also be included in the composition, preferably having sizes ranging from 200 µm to 300 µm.

It is particularly preferred that the well treatment fluid comprises an oilfield fluid, containing the usual drilling fluid components and additives.

In one embodiment, the oilfield fluid comprises drilling fluid, which can be water-based mud, oil-based mud or synthetic mud.

In another embodiment, the oilfield fluid comprises a cement-based formulation and a polymer system or spacer.

A second aspect of the invention provides a method of treating an oil well, comprising:

pumping a composition as claimed in any preceding claim into a borehole;

allowing the fibres to accumulate in a region to be treated;

raising the temperature in the borehole in the region to be treated to a level above the transition temperature of the hot melt adhesive component such that the fibres adhere to each other in the region; and Optionally, allowing the temperature in the region to drop to a level below the transition temperature of the hot melt adhesive component, so as to create an interconnected network of fibres in the region to be treated.

By "raising the temperature" it has to be understood that the composition once pumped is left for a sufficient amount of time so that its temperature rises above its glass transition temperature. In fact, as downhole temperature varies depending on the well the one skilled in the art might have to select the appropriate holt melt adhesives depending on their intrinsic glass transition temperature which shall be from 40° C. to 250° C., preferably from 60° C. to 250° C. depending on thermal properties.

The network preferably forms a screen and/or a network on which a filtercake can form over downhole loss zones.

Other aspects of the invention will be apparent from the following description.

BRIEF DESCRIPTION OF FIGURES IN THE DRAWINGS

FIGS. 1A, 1B and 2 show the association between the hot melt adhesive and the fibres;

FIG. 3 shows the grafting of the hot melt adhesive onto the fibres; and

FIGS. 4 and 5 show fibres associated with hot melted adhesive forming a bridge over downhole fractures and loss zones and trapping particulate solids.

MODE(S) FOR CARRYING OUT THE INVENTION

Figure 6:
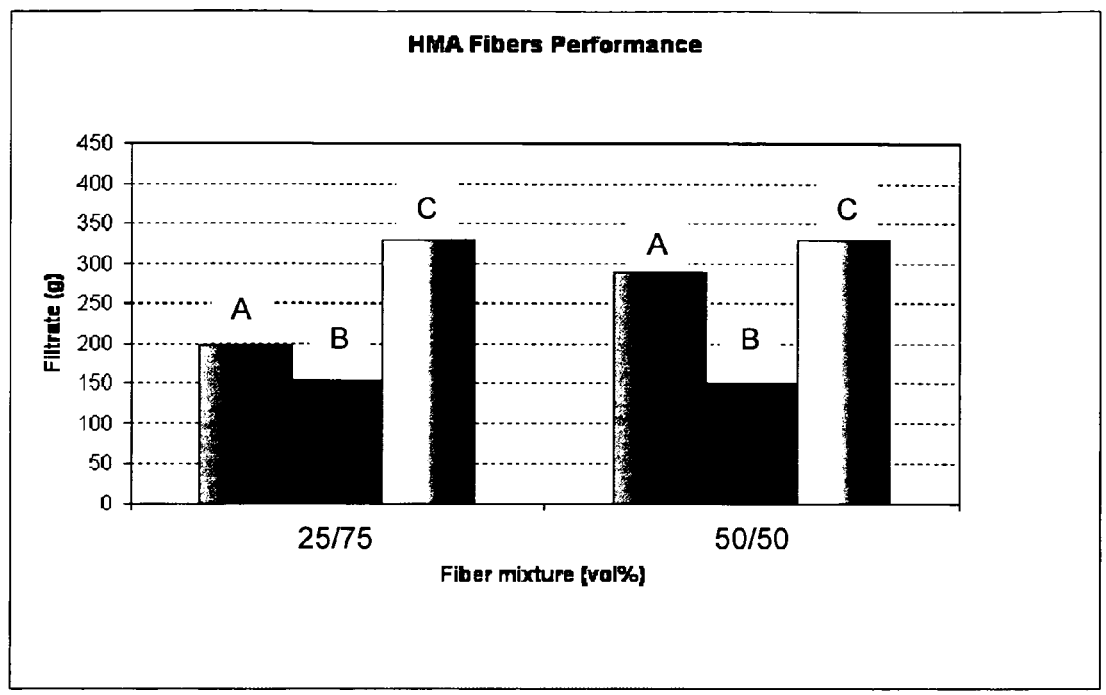
FIG. 6 shows a plot of fluid loss filtrate obtained for different fibre mixtures.

At the outset, it should be noted that in the development of any such actual embodiment, numerous implementation-specific decisions must be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the composition used/disclosed herein may also comprise some components other than those cited. In the summary of the invention and this detailed description, each numerical value should be read once as modified by the term "about" (unless already expressly so modified), and then read again as not so modified unless otherwise indicated in context. Also, in the summary of the invention and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors possessed knowledge of the entire range and all points within the range.

The present invention is based on a composition comprising "treated" fibres on which hot melt adhesives are either coated or grafted and to which loss control materials (LCMs) can be added. Suitable coating method might be found in Materials Science and Engineering: Volume 476, Issues 1-2, 15 Mar. 2008, Pages 29-33, "Urea route to coat inorganic nanowires, carbon fibers and nanotubes by boron nitride". A. Gomathia, M. Ramya Harikaa and C. N. R. Rao. Suitable grafting method might be found in the literature from S. Michielsen, J. Appl. Polym. Sci. 73: 129-136 (1999).

Examples of suitable treated fibres are fiberglass coated with Ethylene vinyl acetate, fiberglass coated with polyamide or fiberglass coated with polyester.

The efficiency of the fibres of the present invention is increased in comparison to conventional use of single or mixed fibres and/or LCMs. The fibres of the present invention not only become sticky at certain temperatures, but also make their surrounding sticky. The stickiness attracts solids in the drilling fluid and/or cement, forming a plug. Where lost circulation is involved, the fibres then form a bridge over the fractures or loss zone, trapping solids in the resulting network to form a filtercake.

The composition of the invention has a wide range of applications including preventing or lessening lost circulation, wellbore strengthening or consolidation, controlling fluid loss, producing a "stress cage" effect, gravel packing, acting as an aid to cementing, and for proppant backflow control. "Stress cage" in the present context shall be interpreted as defined in U.S. Pat. No. 7,284,611 and SPE 110713 "A New Treatment for Wellbore Strengthening in Shale" by Mark S. Aston, SPE, Mark W. Alberty, SPE, and Simon Duncum, BP Exploration, and James R. Bruton, SPE, James E. Friedheim, SPE, and Mark W. Sanders, SPE, M-I Swaco The composition according to the present invention comprises fibres, hot melt adhesives and, optionally, particulate solids. As shown in FIGS. 1A, 1B, 2 and 3, the fibres in the composition may be a single fibre type 1 coated in a hot melt adhesive 2 (FIGS. 1A and 2) or a multi fibre type 3 coated with the hot melt adhesive 4 (FIG. 21), the hot melt adhesives preferably coating the fibres uniformly. Alternatively, hot melt adhesive 5 is grafted, in the form of coarse or fine sized particles, or micron or nano-sized particles, or granules or powder, onto the fibres 6 (FIG. 3). Optimally, the fibre concentration used could be in the range of 0.5 lb/bbl (1.4 g/L) to 8 lb/bbl (23 g/L), preferably 2 lb/bbl (5.7 g/L) to 5 lb/bbl (14.3 g/L); larger fibre concentrations may have the disadvantage of plugging the mixing equipment on rig sites.

The fibres with hot melt adhesives can be pumped alone or mixed with the particulate solids, which are preferably lost circulation materials e.g. fibres, flakes and granular material etc, or other fibres without hot melt adhesives. The fibres without hot melt adhesives can be made of any natural or synthetic material e.g. polypropylene, novoloid, Kevlar, glass, polyamide, polyacrylate, polylactic resin, polyvinyl alcohol, polyester, nylon, or cellulose etc, and preferably have diameters ranging from 10 microns to 500 microns and lengths of 5 mm to 15 mm to improve efficiency.

A composition comprising different types of fibre generally works better than compositions comprising a single type of fibre. Without wishing to be bound by any theory, the inventors believe that as different fibre types have different properties that could help make a better screen or net on the fractures to form a filter cake. Although the figures depict the fibres as cylindrical, in practice the fibres can actually comprise fibres which are round, cylindrical, plate-like, flat, coil-like, spiral, trilobe, or star-shaped, and mixtures thereof.

The hot melt adhesive can be coarse or fine, and can be directly added in the drilling fluid or the cementitious slurry, or in the form of a polymer pill. Optionally, the concentration of hot melt adhesives ranges from 0.1 wt % to 10 wt %. The hot melt adhesive comprises any kind of adhesive material such as polyamides, acrylic based systems, ethylene vinyl acetate, polyurethanes etc.

Preferably, the particulate solids are lost circulation materials present in the drilling fluids and/or cement slurry, and have sizes ranging from 10 µm to 1000 µm.

If used to cure lost circulation during drilling, it is preferable to pump the fibres through a drillbit with the drilling fluid; the drilling fluid, within the context of the present invention can be either a water- or oil-based mud or synthetic mud. When there are issues with lost circulation during cementing; the fibres can be pumped with cement.

If used for wellbore strengthening, the fibres and the hot melt adhesive (in powder form) are preferably mixed with drilling fluid and/or a cement-based formulation on the surface. FIG. 4 shows a borehole 7 that has been drilled through a fractured formation 8 and this resulted in fluid loss. FIG. 5 shows the network of fibres of the composition forming a bridge 9 over fractures or loss zones downhole. Basically, the heightened temperatures downhole, which are approximately in the range of 40° C. to 150° C., cause the hot melt adhesives to reach its transition temperature, turning from solid hot melt adhesives to viscous liquid and causing the fibres to become sticky. At this point, the sticky fibres form a network that traps particulate solids, forming a filter cake useful for curing lost circulation and enhancing wellbore consolidation downhole.

If used for proppant flow back control, the reinforced fibres can be pumped downhole through an open ended drill pipe or the drill bit during drilling, and the temperature at the drill bit and the circulating temperature will initiate the phase transition of the hot melt adhesive from solid to viscous liquid. Once the fibres come out of the drill bit, they can be used for wellbore consolidation as the sticky fibres will not only attract solids from the drilling fluid, but also stick to the formation substrate.

Further compositions and uses within the scope of the invention will be apparent.

The following examples serve to further illustrate the invention. The materials used in the examples are commonly available and used in the well cementing industry.

Example

Two different compositions according to the invention were made. The first one contained 25 vol % HMA+75 vol % glass fibres; and 50 vol % HMA+50 vol % glass fibres. The glass fiber was sourced from OCV under the trade name of Cem-FIL® AR and was used as is. The HMA used in this test was fiberglass coated with Ethylene vinyl acetate, from Engineered Yarns Company, USA under the trade name HM-2270.

Condition A represents a measurement for a cell with a grid of 2 mm holes at a temperature of 25° C.; and condition B is for the same cell at 90° C. In each case, the fibres correspond to those shown in FIG. 2. Condition C is a comparative measurement based on the use of glass fibres only (no HMA), in the same cell at 70° C.

As apparent on FIG. 6, the compositions with HMA show improved fluid loss characteristics compared to the glass fibres alone. All measurement were made using a fluid loss cell.

The invention claimed is:

1. A composition for treating a formation surrounding a borehole, comprising:
   a well treatment fluid including fibres, the fibres being present at a concentration between 1.4 g/L and 23 g/L;
   at least one hot melt adhesive component;
   and at least one solid particulate component;
   wherein the hot melt adhesive is suitable to soften when the temperature in the region of the borehole is raised above the transition temperature of said adhesive component, and wherein particles of the hot melt adhesive component are grafted onto at least some of the fibres.

2. The composition as claimed in claim 1, wherein at least some of the fibres are coated with the hot melt adhesive component.

3. The composition as in claim 1, wherein the fibres have diameters ranging from 10 microns to 500 microns.

4. The composition as in claim 1, wherein the fibres have lengths ranging from 5 to 25 mm.

5. The composition as in claim 1, wherein the fibres comprise polypropylene, novoloid, kelvlar, glass, polyamide, polyacrylate, polylactic resin, polyvinyl alcohol, polyester, nylon or cellulose or combinations thereof.

6. The composition as in claim 1, wherein the hot melt adhesive component comprises polyamides, acrylic based systems, ethylene vinyl acetate, or polyurethanes or combinations thereof.

7. The composition as in claim 1, wherein the hot melt adhesive component is present in an amount of 0.1 wt % to 10 wt %.

8. The composition as in claim 1, wherein the solid particulate component comprises lost circulation materials.

9. The composition as claimed in claim 8, wherein the solid particulate component has a size ranging from 10 μm to 1000 μm.

10. The composition as in claim 1, wherein the well treatment fluid further comprises an oilfield fluid.

11. The composition as claimed in claim 10, wherein the oilfield fluid further comprises at least one solid particulate component in the range of 10 wt % to 60 wt %.

12. The composition as claimed in claim 10, wherein the oilfield fluid comprises a cement-based formulation, a polymer system or a spacer.

\* \* \* \* \*